May 1, 1956  D. J. BURKE  2,743,873
RAIL BOND AND APPARATUS FOR ATTACHING SAME
Filed Oct. 19, 1950  2 Sheets-Sheet 1
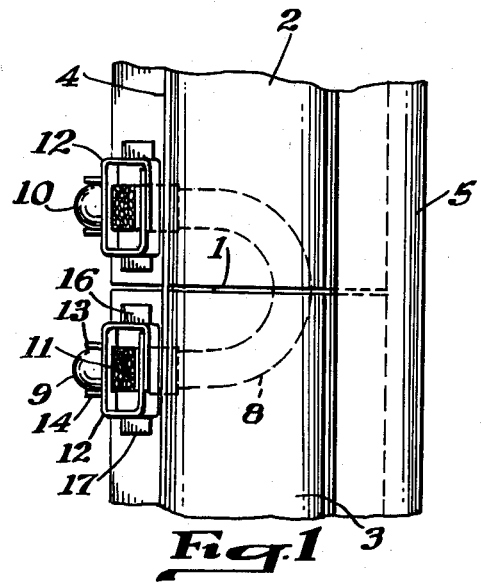
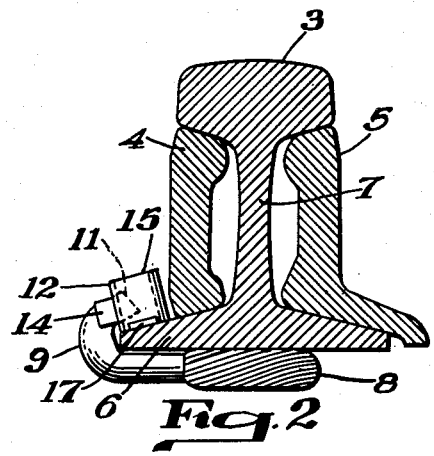
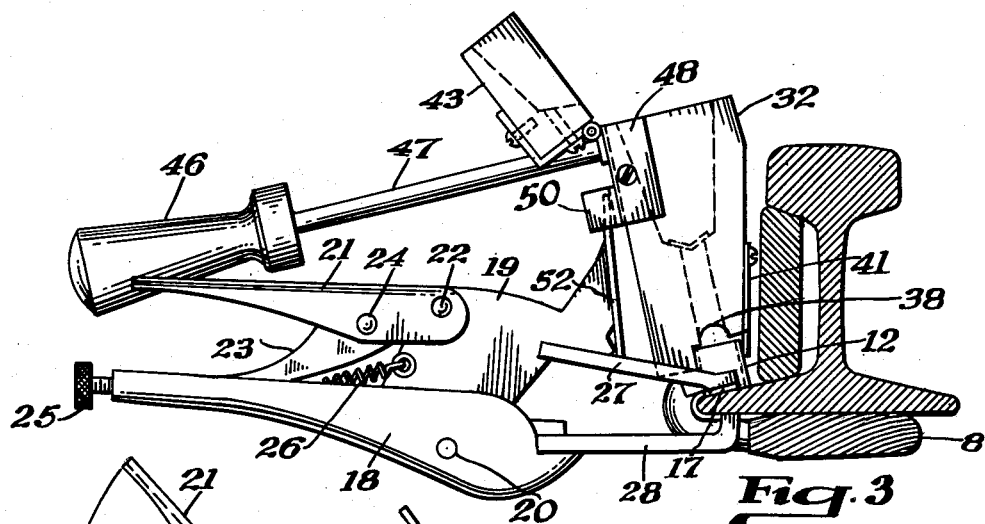
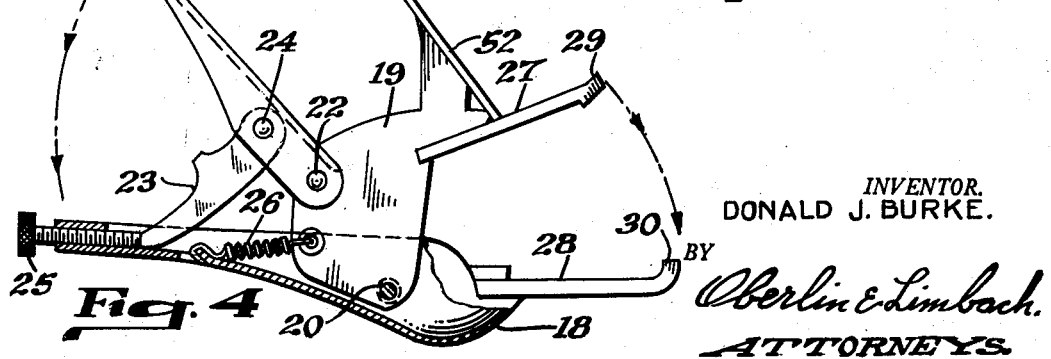
INVENTOR.
DONALD J. BURKE.
BY Oberlin & Limbach.
ATTORNEYS May 1, 1956  D. J. BURKE  2,743,873
RAIL BOND AND APPARATUS FOR ATTACHING SAME
Filed Oct. 19, 1950  2 Sheets-Sheet 2
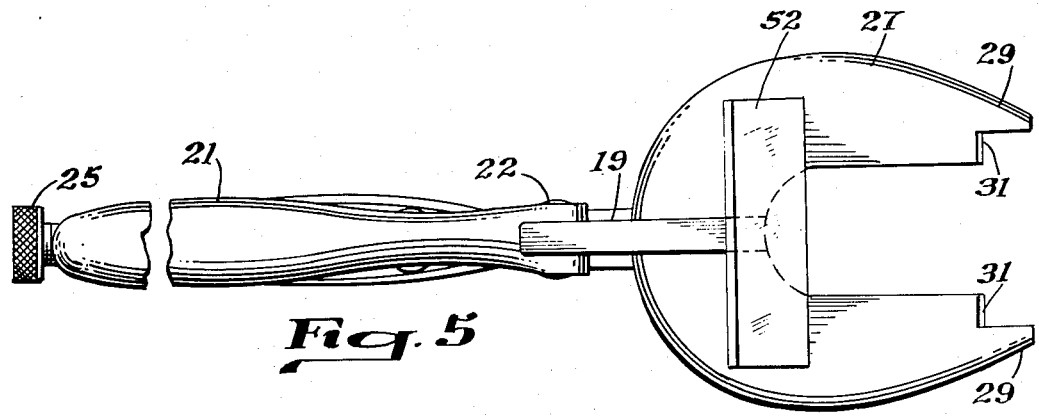
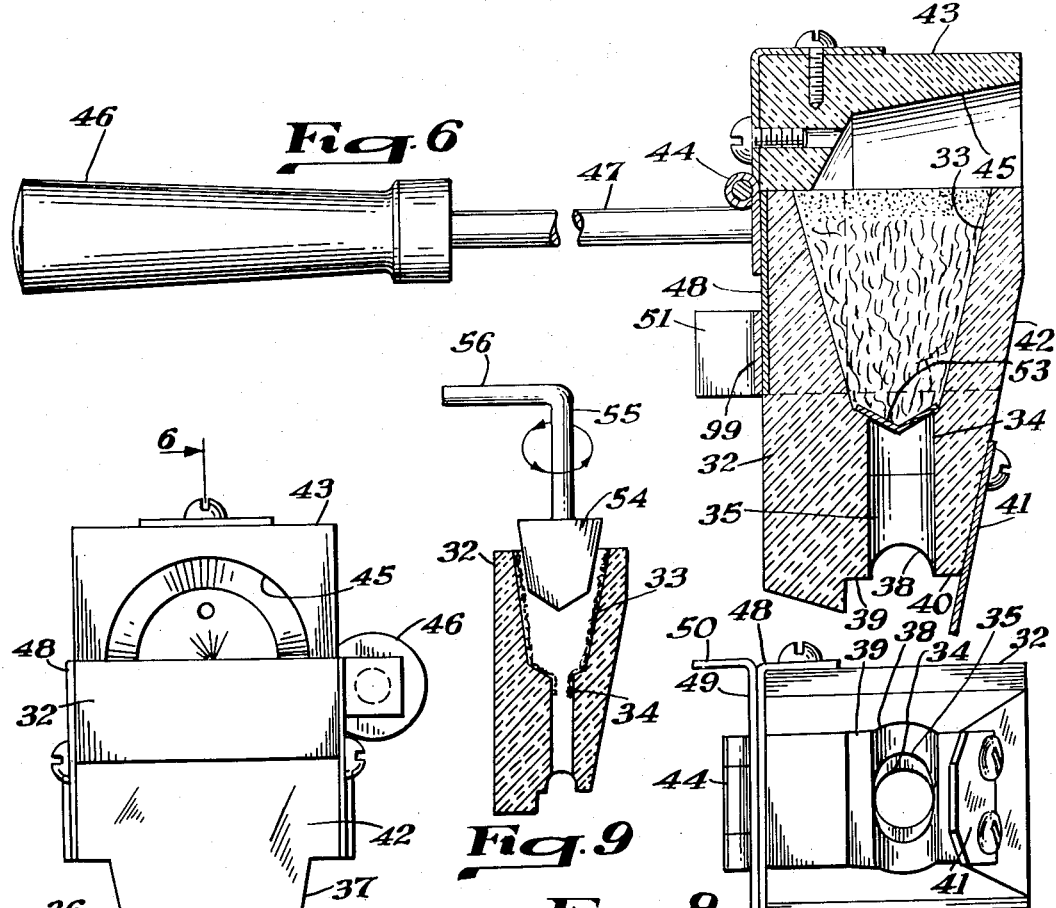
INVENTOR.
DONALD J. BURKE.
BY
Oberlin & Limbach
ATTORNEYS.

United States Patent Office 2,743,873
Patented May 1, 1956

2,743,873

RAIL BOND AND APPARATUS FOR ATTACHING SAME

Donald J. Burke, Cleveland, Ohio, assignor to Erico Products, Inc., Cleveland, Ohio, a corporation of Ohio Application October 19, 1950, Serial No. 190,987

13 Claims. (Cl. 238—14.15)

This invention relates as indicated to a novel rail bond and apparatus for attaching the same to a rail, and more particularly to power bonds adapted to be cast welded to the foot of a rail.

In Patent No. 2,229,045 of Charles A. Cadwell there is disclosed a welding material adapted for use in an exothermic reaction and comprising a mixture of copper oxide and a crushed copper aluminum alloy which, when ignited, will produce a charge of molten copper suitable for immediate use in the welding of a copper or copper alloy rail bond to a steel rail or the like. Patent No. 2,277,014 to Noble G. Carlson discloses a form of rail bonding apparatus particularly suited for use with the aforesaid welding material in the attachment of rail bonds to rails, such apparatus comprising two spaced mold blocks and common clamping means therefor adapted to clamp the same against the side of a rail head. Such welding material and apparatus have enjoyed great commercial success for the past several years.

Power bonds employed on mine railroads, for example, are of much heavier cable than the usual signal bonds and are generally attached to the foot of the rail, the joint bars or fishplates, of course, obstructing the web portions of the rails adjacent the joints between the latter. With one common type of joint bar, an edge portion of the foot of the rail is left exposed and in another type the foot of the rail is substantially entirely covered. While it has proven difficult to weld power bonds to such narrow edge portions of the rail foot, it is nevertheless much preferred to do so when at all possible since otherwise bonds of sufficient length to span the entire length of the joint bar must be employed and the heavy copper cable comprising such bonds is very expensive. It is accordingly a primary object of this invention to provide a rail bond which is adapted to be cast welded to such relatively narrow exposed edge portions of the rail foot, thereby permitting such bond to be of minimum length. The bond of my invention is, however, also of course adapted to be cast welded to the foot of the rail adjacent the respective ends of the joint bar when the form of such joint bar so necessitates, although it will then require a greater length of cable.

It is a further object of my invention to provide apparatus for preliminarily clamping my new bond to the foot of the rail in a manner adapting the same to be thus secured by cast welding employing highly heated molten copper produced by an exothermic reaction as taught in such Cadwell Patent No. 2,229,045 and which will not require the employment of skilled labor in its use.

A further object is to provide cooperating crucible means in which such exothermic reaction is adapted to take place and from which the resultant molten metal will automatically be discharged in proper manner when operatively associated with my new clamping means and bond. It is most important that the molten weld metal should effect a strong juncture with the steel rail and with the individual component strands of the bond in order to obtain both a physically strong terminal and also a terminal having electrical conductivity at least equal to that of the bond itself.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a top plan view of a rail joint showing one embodiment of the bond of my invention positioned thereon for cast welding thereto;

Fig. 2 is a vertical transverse sectional view through one of the rails of Fig. 1 showing such bond thus positioned thereon;

Fig. 3 is a view similar to Fig. 2 but also illustrating the clamping means of my invention securing such bond to the foot of the rail with the crucible positioned thereon for delivery of molten weld metal to form one of the bond terminals;

Fig. 4 is a side elevational view of the clamping means of Fig. 3 partially broken away to illustrate the internal construction of the same and showing such clamping means in open position;

Fig. 5 is an enlarged top plan view of the clamping means of Figs. 3 and 4;

Fig. 6 is an enlarged view in vertical cross-section of the crucible block adapted to be mounted upon such clamping means;

Fig. 7 is an elevational view of the face of such crucible block adapted to be presented toward the rail head;

Fig. 8 is a bottom plan view of such crucible block; and

Fig. 9 is a diagrammatic vertical cross-section of such crucible block showing the manner in which slag is adapted to be removed therefrom after performing the exothermic reaction therein.

Referring now more particularly to said drawing and especially Figs. 1 and 2 thereof, a joint 1 is shown between two rails 2 and 3 secured together in conventional manner by means of joint bars 4 and 5 and the usual bolts (not shown). As best shown in Fig. 2, joint bar 4 only partially obstructs the foot 6 of the rail although the web 7 is, of course, entirely concealed.

The power bond comprising the particular embodiment of the invention illustrated in such figures comprises a relatively short generally U-shaped length of copper cable 8 having its respective end portions enclosed or sheathed in tubular copper sleeves 9 and 10, such end portions being rebent so that the extreme ends 11 of the bond are adapted to overlie the foot of the rail with the body of the bond disposed therebeneath. Such ends 11 of the bond are beveled as best shown in Fig. 2 so that the end faces thereof lie in a plane about 30° from the vertical, thereby exposing the ends of the individual conductor strands to the flow of the molten weld metal delivered from above, as described below. Ordinarily, sleeved portions 9 and 10 will be pressed to generally rectangular cross-section and inserted through correspondingly dimensioned apertures in individual sheet metal caps 12, such apertures being formed by flanging outwardly wing portions 13 and 14 which engage the respective sides of sleeves 9 and 10 to assist in positioning such caps thereon. The caps themselves comprise generally vertically extending wall portions 15 bent to form a generally rectangular mold cavity or reservoir into which the beveled ends 11 of the bond thus extend. The ends of the sheet metal strip from which such cap may preferably be formed are overlapped (Fig. 1) to form a wall of double thickness opposite such beveled ends 11 for a reason which will become clear later. Flat tabs 16 and 17 extend laterally from the lower edges of such wall portions 15 and are adapted to rest on the upper surface of the foot 6 of the rail with the lower edges of such wall portions 15 defining such mold cavity resting flush upon such surface. These tabs serve not only to assist in preliminarily positioning cap 12 upon the foot of the rail but also afford means whereby the same may be firmly clamped in place.

For the purpose of clamping such sheet metal caps 12 to the foot of the rail, I prefer to employ toggle clamping means of the general type shown and described in Petersen Patent No. 2,280,005 provided with special clamping jaw members and also with means for mounting the crucible for cooperation with such cap. As shown in Figs. 3, 4 and 5 of the drawing, such clamping means may comprise a lower handle member 18 of general U-shaped cross-section and a plate 19 pivotally mounted at 20 therein. An upper handle member 21 is pivotally connected at 22 to such plate and carries a depending lever arm 23 pivotally secured thereto at 24. The lower end of such lever arm is adapted to be retained within lower channel-form handle member 18 and to bear against an adjusting screw 25 threaded axially within the latter. A tension spring 26 connected to plate 19 intermediate pivots 20 and 22 and with its other end secured to handle member 18 tends to rock such plate 19 in a counterclockwise direction as viewed in Figs. 3 and 4 and thereby to hold handle members 18 and 21 apart. When such handle members have been manually brought to Fig. 3 position, however, pivot 24 will drop slightly below a line drawn between pivot 22 and the lower end of lever arm 23, thereby affording a toggle action whereby tension spring 26 now serves to hold the clamping jaw members in firm engagement with the tabs on sheet metal cap 12.

Such clamping jaws comprise an upper U-shaped clamping member 27 and a lower corresponding U-shaped jaw member 28 adapted to straddle cap 12 of the bond terminal and the sleeve portions such as 9 and 10 respectively, the two end portions 29 of jaw 27 being shaped to bear firmly upon the upper surface of tabs 16 and 17 and the corresponding end portions 30 of the lower jaw member 28 being upwardly curved and adapted to bear against the underside of the foot 6 of the rail (Fig. 3). As shown in Fig. 5, the opposed inner edge portions of the clamping end portions 29 of the upper jaw member 27 are notched or recessed at 31 to receive wall portions 15 of cap 12.

Referring now to Figs. 3, 6, 7 and 8 of the drawing, I provide a cooperating crucible block 32, preferably of graphite adapted to be supported upon such bond terminal cap 12 and such clamping means. Graphite block 32 is hollowed out to form a generally conical crucible 33 having a sprue 34 extending vertically downwardly from the bottom thereof. The lower portion 35 of such sprue is widened to generally oval cross-section (Fig. 8) in order that the molten weld metal discharged therethrough may be more uniformly delivered to the generally rectangular mold formed by cap 12. The lower portion of block 32 enclosing such sprue is laterally tapered at 36 and 37 so that the extreme lowermost portion of the same may extend downwardly between the legs of upper clamping member 27. A transverse arcuate groove 38 extends across the exit opening of the sprue to vent the mold during the cast welding operation. Steps 39 and 40 to either side of such groove are adapted to rest upon the upper edges of cap 12. A flat plate 41 is secured by means of screws to the inwardly sloping face 42 of crucible block 32, the lower laterally tapered portion of such plate extending downwardly below step 40 and being adapted to engage the side of cap 12 toward the rail.

A graphite cover member 43 is hingedly mounted at 44 on such crucible block 32 and hollowed out to provide a vent 45 for such crucible opening in the general direction of the rail when such crucible block has been mounted in welding position. A handle 46 is mounted on a rod 47 welded to a bracket on the sheet metal frame 48 secured to crucible block 32 and carrying hinge 44, whereby such crucible may be manipulated even after it has become heated in use.

Also welded to sheet metal frame 48 below hinge 44 is a flat metal strip 49 having short rearwardly extending flanges or wings 50 and 51. When the crucible block is mounted in welding position as shown in Fig. 3, such wings are adapted closely to embrace the sides of upstanding flat metal plate 52 welded to upper jaw member 27 and plate 19 of the clamping device.

The operation of my new welding apparatus may now be understood. My new bond will first be positioned on the foot of the rail as shown in Figs. 1 and 2, the upper surface of such rail foot having first been scraped in the region of the bond terminals to remove any rust, grease or like foreign matter. The clamping mechanism will next be caused to engage the tabs 16 and 17 of cap 12 of one of such terminals and such cap will thereby be firmly clamped to the foot of the rail. Since such cap fits within recesses 31 of upper jaw member 27, it will be apparent that upstanding guide plate 52 will have been definitely positioned relative to such cap when the latter is clamped in place. The crucible block 32 is now mounted on such cap 12 and clamping mechanism, tapered plate 41 closely overlying the side of cap 12 toward the rail and step 39 resting upon the upper edge of the opposite side of such cap. The mold block is permitted to lean rearwardly and rest against plate 52 of the clamping mechanism with wings 50 and 51 embracing opposite sides of the upper portion of such plate. The mold block is thus not only supported by such plate 52 but is definitely positioned relative to cap 12. The exact degree of rearward inclination of the mold block will vary slightly from rail to rail, but this is not of importance. Nor is it necessary that step portion 40 of the lower end of the mold block rest on the corresponding upper edge of cap 12. A cartridge of the exothermic welding powder as taught in Cadwell Patent No. 2,229,045 is emptied into crucible 33 (Fig. 6), such cartridge containing easily ignited starting powder in the bottom thereof so that such starting powder will be on top of the charge when the cartridge has been thus emptied into the crucible. A thin dished steel disc 53 will preliminarily have been inserted in the bottom of the crucible to cover the upper opening of sprue 34. Cover 43 will now be swung from Fig. 3 to Fig. 6 (closed) position. The exothermic reaction mixture will now be ignited by means of a flint gun whereupon the charge of molten metal produced thereby promptly melts through the thin sheet metal disc or gate 53 and drops down the sprue into the mold cavity defined by cap 12.

Since the end 11 of the bond is upwardly beveled, the molten metal will strike the ends of the component strands exposed thereby and form an excellent weld therewith. As previously explained, the wall of cap 12 on the side toward the rail will be of a double thickness so that the portion of the molten metal stream deflected thereagainst will not melt down and break through such wall. It has been found in practice that an exceptional weld is obtained both with the end of the bond and also with the foot of the rail but with a relatively small degree of adherence to the sheet metal cap 12 enclosing the resultant cast welded terminal. It is important that the amount of exothermic reaction mixture employed produce metal sufficient slightly to cover the exposed end 11 of the bond but that the amount of metal thus produced should be insufficient to overflow the upper edge of cap 12. If such overflow takes place, the highly heated weld metal will immediately cut down the wall of such cap, permitting the reservoir of molten metal contained therein to escape. It will be appreciated that the weld metal which is thus delivered to the mold formed by cap 12 as a unit charge is of very high temperature, thereby producing a weld far superior to that obtainable by depositing increments of weld metal from an electric arc or by pouring molten copper from a ladle, for example. On the other hand, such small superheated charge requires proper arrangement of the cap and bond end as described, in order to secure a satisfactory terminal.

The slag formed by the exothermic reaction will fill the upper portion of cap 12 above the level of the weld metal therein (ordinarily about ⅛ of an inch) and will then overflow through the lateral vents afforded by groove 38. There is accordingly no substantial deposit of such solidified flux in the sprue itself which would otherwise be badly clogged and require a difficult cleaning operation.

The crucible block will now be lifted from the finished terminal by means of handle 46, and the clamping mechanism unclamped and shifted to the cap on the other end of the bond ready for performance of a similar welding operation at such new station. Before again charging crucible 33, the latter will first be cleaned of the small globules of slag adhering to the inner surface thereof in the manner diagrammatically illustrated in Fig. 9 of the drawing. I employ a cleaning tool comprising a flat metal plate 54 having its edge portions shaped to conform to the interior of such crucible and with a rod 55 extending axially therefrom. The end portion 56 of such rod is bent at right angles both to serve as a handle whereby scraping tool 54 may be rotated within the crucible and also to serve as a cleaning tool for sprue 34 which inserted from the lower end of the latter. After cleaning the crucible, the latter will now be positioned on the clamping mechanism and cap 12 of the other bond end ready for the next welding operation.

It will be seen that I have provided a bond and welding means whereby a terminal may be cast in the narrow space between a joint bar and the edge of the rail foot with a minimmum of skill on the part of the operator. Under such circumstances the usual graphite mold is impracticable since the thin walls necessary would be subject to early fracture. Furthermore, the relatively expensive graphite molds rapidly become worn in use and must be replaced, this being an item of expense particularly when the crucible is hollowed from the same graphite block. The sheet metal caps are not only inexpensive but also the graphite crucibles may be employed for long periods since the inevitable wear is not of nearly as much importance in their case as in the case of graphite molds where proper dimensions must be held.

The sheet metal from which such caps 12 are preferably formed will usually be of from 12 to 18 gauge, and 16 gauge is preferred. Not only should such material be of such relatively thin gauge to facilitate manufacture (such as cutting the opening for entry of the bond end close to the lower edge of the cap) but also heavy gauge material would absorb too much heat from the weld metal and militate against the obtaining of a proper weld. On the other hand, very thin sheet metal would be penetrated by the flow of highly heated molten metal. As previously explained, a wall portion of extra thickness is provided on the side of the cap opposite the end of the bond to prevent such pentration in this local region which is subjected to initial impingement of the molten metal flow. The end of the bond within cap 12 is slightly spaced above the surface of the rail foot to permit weld metal to flow therebeneath, not only obtaining a weld of greater area but also causing the entire sleeved portion of the bond within cap 12 to be enclosed in metal of the weld terminal to reinforce the same.

The sprue leading from the crucible is enclosed throughout most of its extent so that the molten metal is not permitted to cool en route to the mold and is delivered directly to the latter. Cap 12 forming such mold must fit tightly against the foot of the rail since the highly heated molten copper is quite fluid when initially delivered thereto. Since the total volume of copper forming the cast terminal is small, however, it will solidify promptly, permitting removal of the clamping mechanism.

It will be appreciated that the shape and dimensions of the bond conductor intermediate the terminals is a matter of choice and for many purposes a simple U-shape will be preferred, requiring no modification in the caps, apparatus or method above described.

Whereas graphite molds may absorb moisture on standing, with the result that initial welds may be somewhat spongy, no such difficulty is encountered with the metal caps. Each bond has its own molds (caps) preliminarily mounted thereon so that there is no opportunity for the worker in the field to run short of this item. Nor need work be interrupted due to a broken or worn-out mold as is the case when graphite molds are employed.

Other modes of applying the principle of the invention may be employed, change being made as regards the details described, provided the features stated in any of the following claims or the equivalent of such be employed.

I therefore particularly point out and distinctly claim as my invention:

1. An assemblage for cast welding a rail bond to the foot of a rail, comprising a conductor having a sheet metal mold cap mounted on an end thereof, said cap comprising a sheet metal well apertured on one side for insertion of such conductor end therein closely fitting such aperture, and flat tabs flanged out laterally of said cap from the lower edge of the same adapted to rest on the upper surface of the foot of such rail with such lower edge likewise flush therewith in sealing engagement with such surface; clamping means operative to clamp said flat tabs against the upper surface of a rail foot; and cooperating means for delivering a charge of molten weld metal produced by an exothermic reaction to the mold cavity defined by said sheet metal cap comprising a crucible having a sprue passage leading downwardly from the bottom thereof adapted to rest upon said cap, and means on said crucible adapted to engage said clamping means to position such sprue passage generally centrally over said cap.

2. Apparatus for cast-welding a conductor to a generally horizontal surface comprising the assemblage of a metal mold member having a circumferential wall portion but open top and bottom, such wall portion being apertured to receive the end of a conductor, a conductor end inserted through such aperture and closely fitting the same; clamping means operative to clamp said mold member against such surface with the bottom edge of such wall portion making sealing contact wtih such surface; and cooperating means for delivering a charge of molten metal produced by an exothermic reaction to such mold cavity defined by such wall portion comprising a crucible having a sprue passage leading downwardly from the bottom thereof adapted to rest on said mold member, and means adapted to interengage said crucible and clamping means to position such sprue passage generally centrally over such mold cavity.

3. Apparatus for cast-welding a rail bond to the foot of a rail comprising the assemblage of a conductor, a sheet metal mold cap mounted on an end of said conductor comprising a sheet metal well apertured on one side for insertion of such conductor end therein closely fitting such aperture, sheet metal wing portions flanged outwardly of such aperture adapted to engage and brace said conductor in this region, flat tabs flanged out laterally of said cap from the lower edge of the same adapted to rest on the upper surface of the foot of such rail with such lower edge likewise flush therewith in sealing engagement with such surface, such sheet metal wall portions being overlapped to double thickness on the side opposite such aperture through which such conductor end enters; and clamping means operative to hold said cap and therefore said conductor in proper position on the foot of such rail comprising pivotally connected upper and lower jaw members, and means operative to hold said jaw members in clamping position, the said upper jaw member being adapted to bear down upon said laterally extending flat tabs on said cap and said lower jaw member to engage the underside of the foot of such rail.

4. A rail bond adapted to be cast-welded to the upper surface of the foot of a steel rail comprising a stranded copper conductor having its end portions enclosed in closely fitting tubular copper sleeves, such sleeved end portions being bent in order that they may overlie the foot of a rail with the main body of said conductor therebeneath, a sheet metal mold cap mounted on each of such conductor ends comprising a well of approximately 16 gauge sheet steel apertured on one side for entry of such conductor end therein, the extreme end of said conductor being upwardly beveled and generally centrally positioned within the mold cavity defined by the generally upright sheet metal walls of said cap, sheet metal wing portions flanged outwardly of such aperture adapted to engage such sleeve to brace said conductor in this region, and flat tabs flanged out laterally of said cap from the lower edge of the same adapted to rest on the upper surface of the foot of such rail with such lower edge likewise flush therewith in sealing engagement with such surface, such sheet metal wall portions being overlapped to double thickness on the side opposite such aperture through which such conductor end enters.

5. A rail bond assembly adapted to be cast-welded to the upper surface of the foot of a steel rail comprising a stranded conductor having its end portions enclosed in closely fitting tubular sleeves, such sleeved end portions being pressed to generally rectangular cross-section, a sheet metal mold cap mounted on each of such conductor ends comprising a well of from 12 to 18 gauge sheet steel apertured on one side for insertion of such conductor end therein with such sleeved end portion closely fitting such aperture, the extreme end of said conductor being upwardly beveled and generally centrally positioned within the mold cavity defined by the generally upright sheet metal walls of said cap, sheet metal wing portions flanged outwardly of such aperture adapted to engage such sleeve to brace said conductor in this region, and flat tabs flanged out laterally of said cap from the lower edge of the same adapted to rest on the upper surface of the foot of such rail with such lower edge likewise flush therewith in sealing engagement with such surface, such sheet metal wall portions being overlapped to double thickness on the side opposite such aperture through which such conductor end enters.

6. A conductor assembly adapted to be cast-welded to a generally horizontal surface such as the foot of a rail, for example, comprising a conductor, a sheet metal mold cap mounted on an end of said conductor comprising a sheet metal well apertured on one side for insertion of such conductor end therein closely fitting such aperture, sheet metal wing portions flanged outwardly of such aperture adapted to engage and brace said conductor in this region, and flat tabs flanged out laterally of said cap from the lower edge of the same adapted to rest on the upper surface of the foot of such rail with such lower edge likewise flush therewith in sealing engagement with such surface.

7. A conductor assembly adapted to be cast-welded to a generally horizontal surface such as the foot of a rail, comprising a conductor, and a sheet metal mold member mounted on an end portion thereof, said mold member being open at the top for introduction of weld metal and open at the bottom for direct contact of such weld metal with such surface, the side of said mold member being apertured a short distance above the lower edge thereof with said conductor extending through such aperture in closely fitting relationship, the extreme end of said conductor being positioned generally centrally of the mold cavity and slightly spaced above the bottom of the latter.

8. A conductor assembly adapted to be cast-welded to a generally horizontal surface such as the foot of a rail, comprising a stranded conductor having an end portion tightly encased in a sheet metal sleeve, and a sheet metal mold member mounted on such end portion, said mold member being open at the top for introduction of weld metal and open at the bottom for direct contact of such weld metal with such surface, the side of said mold member being apertured a short distance above the lower edge thereof with such sleeved end portion of said conductor extending through such aperture in closely fitting relationship, the extreme end of said conductor being beveled upwardly to expose the ends of such strands to direct impingement of weld metal entering the mold cavity from above, such extreme end being positioned generally centrally of the mold cavity and slightly spaced above the bottom of the latter.

9. A conductor assembly adapted to be cast-welded to a generally horizontal surface such as the foot of a rail, comprising a stranded conductor having an end portion tightly encased in a sheet metal sleeve, and a sheet metal mold member mounted on such end portion, said mold member being open at the top for introduction of weld metal and open at the bottom for direct contact of such weld metal with such surface, the side of said mold member being apertured a short distance above the lower edge thereof with such sleeved end portion of said conductor extending through such aperture in closely fitting relationship, the extreme end of said conductor being beveled upwardly to expose the ends of such strands to direct impingement of weld metal entering the mold cavity from above.

10. A mold cap adapted to be mounted on the end of a rail bond for cast-welding the latter to the foot of a rail comprising a vertically extending wall portion of from 12 to 18 gauge sheet steel defining and enclosing a mold cavity open at the top for introduction of molten weld metal and open at the bottom for direct contact of such metal with the surface of such rail foot, such sheet metal wall portion being overlapped to double thickness in one portion and apertured in a portion generally opposite to such double thickness portion to receive the end portion of such bond inserted therethrough, sheet metal wing portions extending outwardly on either side of such aperture adapted to engage and brace such bond, and flat sheet metal tabs flanged out laterally of the bottom edge of said cap intermediate such double thickness and apertured wall portions adapted to rest on the surface of such rail foot flush with such bottom edge.

11. A mold cap adapted to be mounted on the end of a rail bond for cast-welding the latter to the foot of a rail comprising a vertically extending sheet metal wall portion defining and enclosing a mold cavity open at the top for introduction of molten weld metal and open at the bottom for direct contact of such metal with the surface of such rail foot, such wall portion being apertured to receive the end portion of such bond inserted therethrough, and flat sheet metal tabs extending laterally of the bottom edge of said cap adapted to rest on the surface of such rail foot flush with such bottom edge.

12. A crucible for use in the production of weld metal by an exothermic reaction comprising a graphite block hollowed out in its upper portion to form a crucible cavity, a generally straight sprue passage leading from the bottom of such cavity to the bottom of said block, and a transverse groove in the bottom of said block across the exit opening of said sprue passage to provide lateral vents when such exit opening is presented to a subjacent mold cavity.

13. A crucible for use in the production of weld metal by an exothermic reaction comprising a graphite block hollowed out in its upper portion to form a crucible cavity, a generally straight sprue passage leading from the bottom of such cavity to the bottom of said block, a flat metal plate secured to a side of said block and extending therebelow, a downward extension of said block on the side opposite said plate, whereby said block may be registered relative to a mold seated between said plate and extension, and a transverse groove in the exit opening of said sprue passage to provide lateral vents when such exit opening is presented to a subjacent mold cavity.

References Cited in the file of this patent

UNITED STATES PATENTS

| | | |
|---|---|---|
| 717,840 | Goldschmidt | Jan. 6, 1903 |
| 1,542,598 | Begtrup | June 16, 1925 |
| 1,687,297 | Larson | Oct. 9, 1928 |
| 1,687,378 | Mample | Oct. 9, 1928 |
| 1,712,426 | Febrey | May 7, 1929 |
| 1,828,020 | Beauregard | Oct. 20, 1931 |
| 1,852,694 | Cadwell | Apr. 5, 1932 |
| 1,865,717 | Nardini | July 5, 1932 |
| 1,883,755 | Begtrup | Oct. 18, 1932 |
| 1,945,404 | Mosebach | Jan. 30, 1934 |
| 2,014,278 | Cadwell | Sept. 10, 1935 |
| 2,238,926 | Cadwell | Apr. 22, 1941 |
| 2,262,755 | Cadwell | Nov. 18, 1941 |
| 2,276,823 | Cadwell | Mar. 17, 1942 |
| 2,277,014 | Carlson | Mar. 17, 1942 |
| 2,280,005 | Petersen | Apr. 14, 1942 |
| 2,360,758 | Cadwell | Oct. 17, 1944 |
| 2,401,048 | Cadwell | May 28, 1946 |
| 2,464,210 | Cadwell | Mar. 15, 1949 |